No. 841,520. PATENTED JAN. 15, 1907.
A. HÉRISSON.
FRICTION CLUTCH.
APPLICATION FILED NOV. 7, 1905.

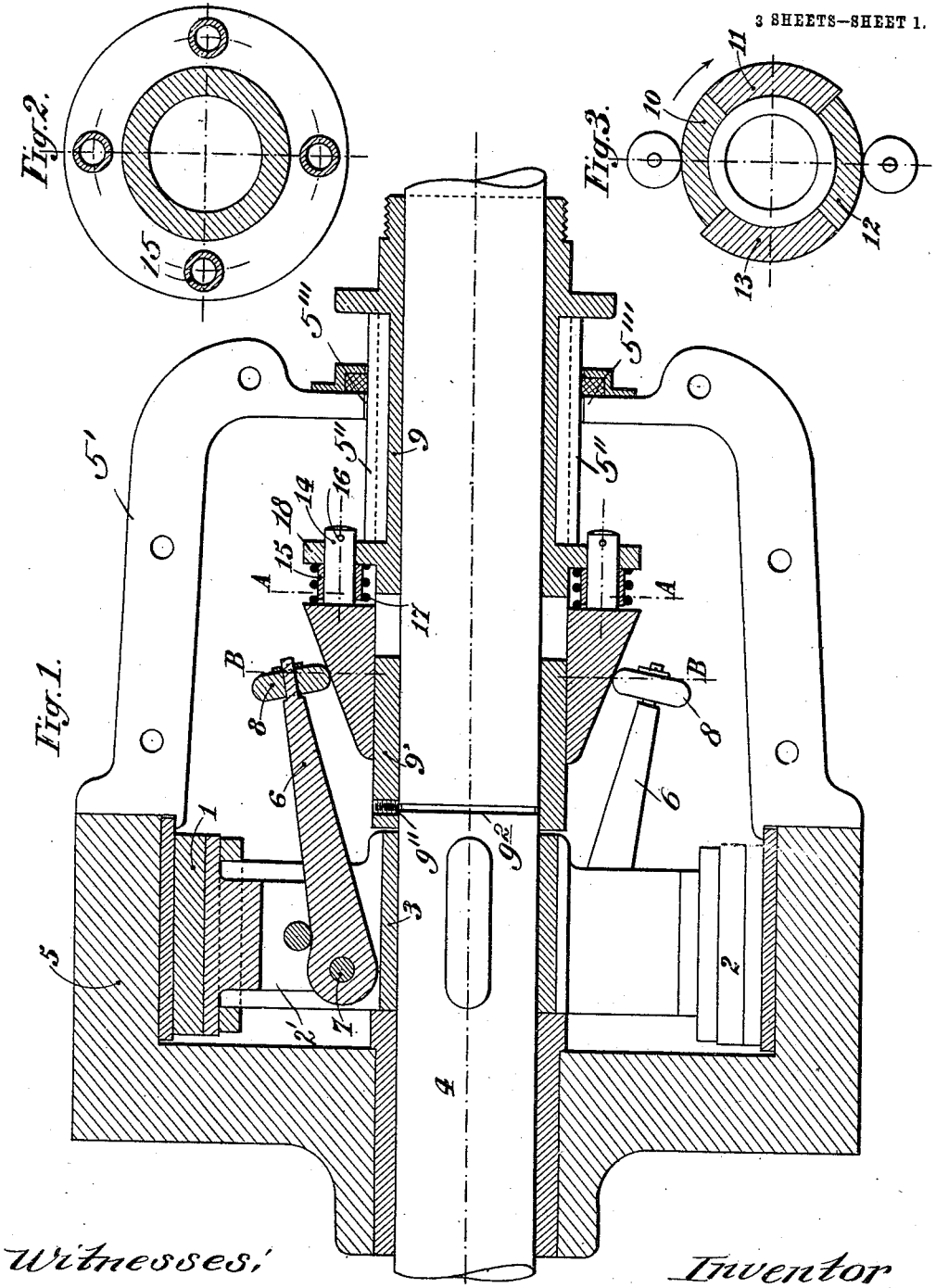

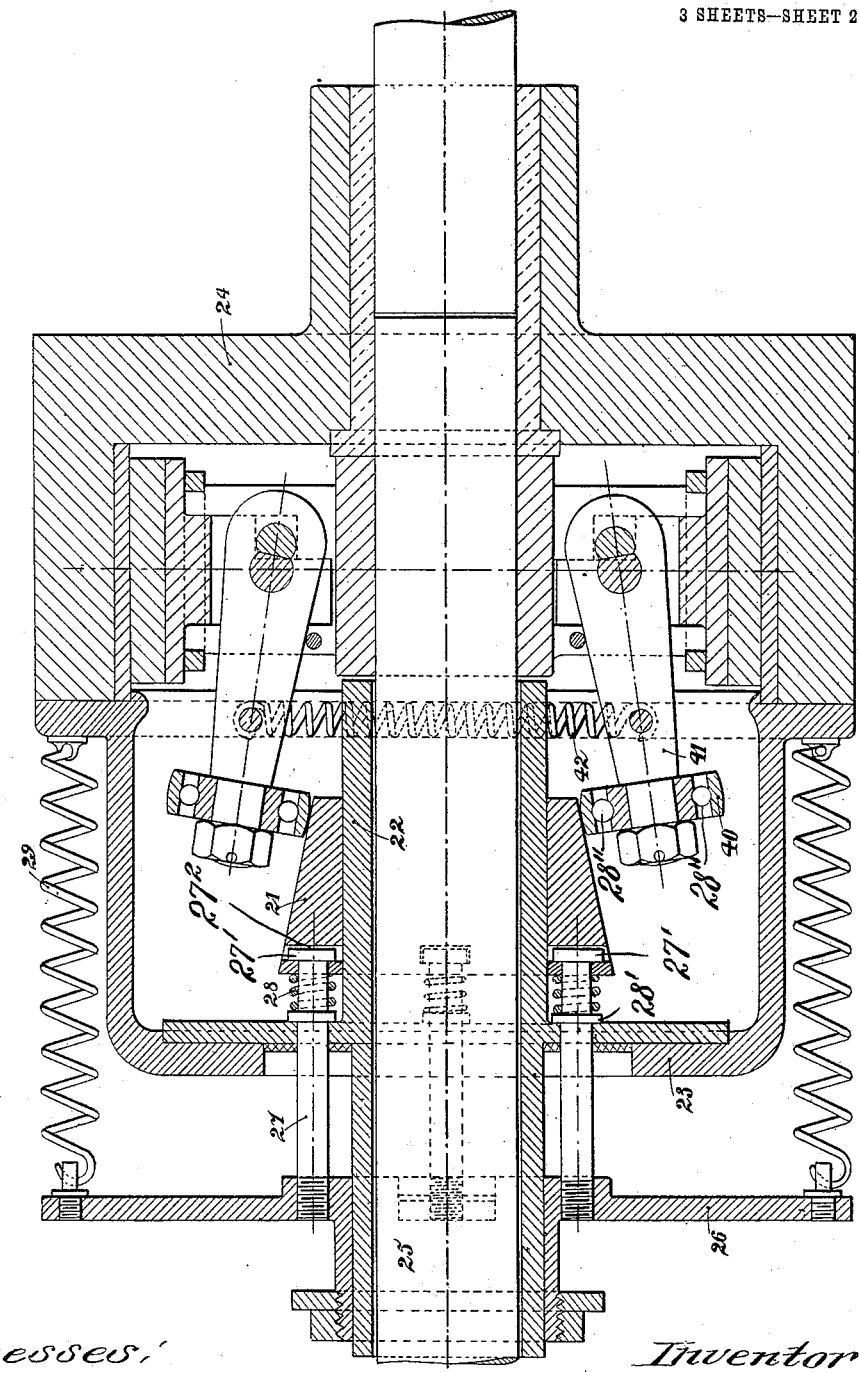

3 SHEETS—SHEET 3.

Witnesses:

Inventor
Albert Hérisson
By
James L. Norris.
Attys.

UNITED STATES PATENT OFFICE.

ALBERT HÉRISSON, OF NIMES, FRANCE.

FRICTION-CLUTCH.

No. 841,520.  Specification of Letters Patent.  Patented Jan. 15, 1907.

Application filed November 7, 1905. Serial No. 286,302.

*To all whom it may concern:*

Be it known that I, ALBERT HÉRISSON, engineer, a citizen of the French Republic, residing at Nimes, Department of the Gard, France, have invented certain new and useful Improvements in Friction-Clutches, of which the following is a specification.

This invention relates to an improved friction-clutch gear in which its gradual engagement and adjustment are obtained in a very efficient manner, the power required for the application of the gear being derived from the motor.

Figure 5:
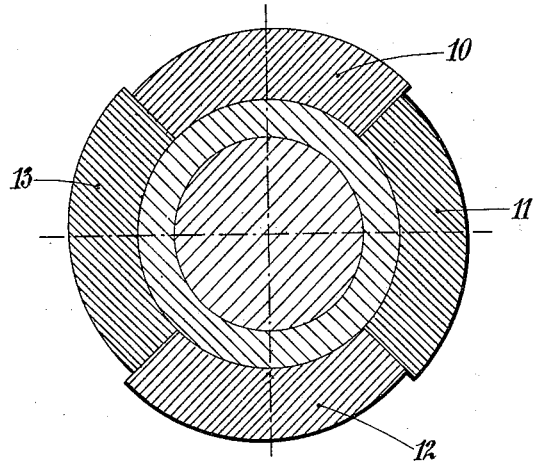
Figure 6:
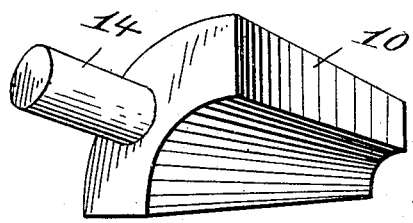

In the accompanying drawings, Figure 1 is a longitudinal section through the axis of the friction-clutch gear constructed according to this invention. Fig. 2 is a section on the line A A of Fig. 1. Fig. 3 is a section on the line B B of Fig. 1; Fig. 4, a longitudinal section of a modification: Fig. 5, a section corresponding to Fig. 3 when the rollers are not engaging with the cone-sections, and Fig. 6 a perspective view of one of the cone-sections.

Similar reference characters indicate corresponding parts throughout the several views.

The engagement of the clutch is obtained by means of two movable shoes 1 and 2, mounted between arms 2' on a sleeve 3, keyed on a shaft 4 to be driven. (Shown in Fig. 1.) These shoes can be moved radially away from the axis of the said shaft and come in contact with and press against the inner wall of a cup-shaped member 5, driven by the motor. This is effected by means of levers 6, pivoted at one end 7 to the arms 2', supporting the said shoes 1 and 2, and provided at the other or free end with rollers 8, which bear on a cone which can slide on a sleeve 9', mounted loose on the shaft 4 by the engagement of the set-screw 9'' in the groove 9² in the said shaft 4 and set in rotation by means of claws (not shown) by a sleeve 9, capable of being moved on the shaft 4 toward the shoes by means of a forked lever when it is desired to throw the clutch into gear. The sleeve 9 rotates with the cover 5' of the cup-shaped member 5, but can move longitudinally relative to this cover, the result being obtained by means of two keys 5'', fixed to the sleeve and passing through the grooves 5''', provided in the said cover.

The cone on which the rollers 8 bear consists of an even number of parts—say four—numbered 10, 11, 12, and 13, as shown in Fig. 3 of the drawings. Each of these parts is kept in position on the sleeve 9 by a tailpiece 14, passing through a sleeve 15 and an opening in a projection 18, formed with the said sleeve. A split piece 16 prevents the tailpiece 14 from leaving the opening in the projection 18, while a helical spring 17 tends to keep the parts 10, 11, 12, and 13 away from the collars. A small space left between the cone and collars 15 allows a play between the said cone and collars and permits the said cone parts to move backward a limited distance.

To throw the clutch into gear, the sleeve 9 is shifted toward the shoes 1 and 2, the latter remaining stationary and the cone and sleeve being carried by the rotation of the motor. The rollers 8 move on the cone parts 10, 11, 12, and 13, and the shoes begin to recede from the shaft. When the shoes begin to bear against the cup-shaped member 5, the levers 6 and the rollers 8 provided thereon oppose the progress of the two cone parts—say 10 and 12—on which the rollers contact. As the sleeve continues to move forward under the action of the forked lever the springs of the cone parts 10 and 12 are compressed and allow of the cone parts remaining stationary. The cone parts 11 and 13, on the contrary, will move forward with the sleeve. When the rollers 8 in revolving come on the cone parts 11 and 13, the said rollers are raised by an amount equal to the projections of the surface of the cone parts 11 and 13 beyond the surface of the cone parts 10 and 12. The pressure of the shoes is thus increased at the same time the springs of the parts 10 and 12 are released and the parts 10 and 12 moved forward with the sleeve, while the parts 11 and 13 are kept in position and their springs are compressed. On passing again over the parts 10 and 11 the rollers are again raised, and this action takes place each time the rollers pass from one pair of cone parts to the next part. The clutch is thus gradually thrown into gear until the shaft 4 is engaged with the cup-shaped member.

In order that the rollers may pass from one cone part to another cone part without jerking, it is advisable to adopt a spiral curve for the outline of their base, as shown in Fig. 3. In the meantime the parts 10 and 12 are kept in position by the rollers 8, while the parts 11 and 13 have moved forward, so that the rollers 8 can pass without a jerk from the parts 10 and 12 to the parts 11 and 13. When subsequently the rollers 8 keep the parts 11 and 13 in position, the parts 10 and 12 move longitudinally to the same extent, since the progress of all the parts is limited, so that the rollers pass from 11 to 12 without a jerk.

The operation of this friction-clutch would be the same if only one lever and a cone consisting only of two parts were used. In the modification shown in Fig. 4 the four parts of the cone 21 can slide on a sleeve 22, integral with the cover 23 of the cup-shaped member 24, rotating with the driving-shaft. The sleeve 22 is mounted around the driven shaft 25; but a sufficient space has been provided between the said sleeve and shaft for preventing a friction between these parts when the cup-shaped member 24 rotates and the driven shaft 25 remains motionless. On the sleeve 22 the four-part cone 21 slides. Said cone is connected with arms 26 and carries rods 27, having enlarged terminals 27' in engagement with sockets $27^2$ in the cone parts. On the rod 27 is mounted a spring 28, having a bearing against the same and the cone 21, so as to hold the said parts in a yieldable relation to each other, and prevents said parts from having any lost motion. Springs 29, having connection with the cover 23 and the arms 26, act for bringing this sleeve toward the cup 24, and thus for driving the cone 21 beneath the rollers 40 on the arms 41, carrying the shoes. It is apparent that when the arms 26 are moved to the right the cone-sections 21 tend to have the same motion, two of these cone-sections being stopped by the rollers, their springs 28 are compressed between the washers 28', surrounding the rods 27 and the cone-sections themselves, and owing to the play which exists within the socket $27^2$, formed in the cone-sections, the arms 26 continue to go forward, drawing with them the other two cone-sections, which can advance beyond these which are stopped. The rollers 40 are mounted on ball-bearings 28'' to render the working more easy. Acting on the arms 41 is a spring 42 to bring nearer the ends of the said arms 41, and thus for removing the shoes from the cup-shaped member. This device works in the same manner as the device described hereinbefore and shown in Figs. 1, 2, and 3.

Having described the invention, what is claimed is—

1. A clutch-gear involving a rotatable cup-shaped element, a shaft for supporting the same, movable contact-shoes for engagement with said element, pivotal members coöperative therewith for actuating the same, rotatable means on the free terminals of the said members, a cone including independent sections, a slidable sleeve carried by the shaft and for supporting the sections, each section of the said cone adapted for engagement with the rotatable means for moving the members in a radial direction, and means for bringing the cone-sections into engagement with the rotatable means.

2. A clutch-gear having a rotatable element, a rotatable shaft having arms, movable shoes radially adjustable with respect to the longitudinal axis of said shaft for engagement with said element and supported by the arms, levers pivotally connected with said arms and the shoes for actuating the latter, a cone including a plurality of sections slidable longitudinally on the shaft, tension means associated with and acting directly upon each section of the cone, frictional means on the terminals of the said levers for engagement with the cone, a spring connected with the respective levers for holding the friction means in contact with the cone, the movement of said cones adapted to actuate the levers to bring the shoes in contact with the rotatable element, and means for bringing the cone into engagement with the frictional means.

In testimony whereof I have hereunto set my hand in presence of two subscribing witnesses.

ALBERT HÉRISSON.

Witnesses:
 HENRI MONTEL,
 FERNAND MONTEL.